United States Patent Office 3,231,637
Patented Jan. 25, 1966

3,231,637
NITROGEN BASE DERIVATIVES OF IMIDODI-
PHOSPHATE ESTERS
Morris L. Nielsen, Dayton, Ohio, assignor to Monsanto
Company, a corporation of Delaware
No Drawing. Filed Dec. 1, 1961, Ser. No. 156,504
4 Claims. (Cl. 260—926)

The present invention relates to new compositions of matter and to processes for the manufacture of derivatives of tetra-substituted imidodiphosphates such as the cyclohexylamine derivative of tetraphenyl imidodiphosphate, $C_6H_{11}NH_2 \cdot (C_6H_5O)_2P(O)NHP(O)(OC_6H_5)_2$ It is an object of the invention to prepare various nitrogen base derivatives of tetra-substituted imidodiphosphates which are of utility as bacteriostatic or fungicidal agents and are intermediates in the preparation of substituted imidodiphosphates.

The reactants employed in the present invention are the tetraalkyl and tetraaryl esters of imidodiphosphoric acid such as those containing the unsubstituted, the nitro-substituted, and the sulfonate-substituted alkyl and aryl radicals having from 1 to 16 carbon atoms. The nitrogen bases include ammonia, ammonia derivatives such as hydrazine, phenylhydrazine or guanidine, and amines which may be aliphatic, aromatic or heterocyclic in nature, including primary, secondary or tertiary, and mono- or poly-functional, and are limited to 1 to 16 carbon atoms. This type of grouping is based on the analogous system of grouping of ammonium ions given in the 1957 report of the Commission on the Nomenclature of Inorganic Chemistry of the International Union of Pure and Applied Chemistry (J. Am. Chem. Soc., 82, 5523 (1960)).

The present invention is based upon the reaction of a tetraalkyl or tetraaryl ester of imidodiphosphoric acid with a nitrogen base so as to form an addition compound containing one basic nitrgen for each molecule of the tetra ester.

The products thus have the general formula:

$Z \cdot [(RO)_2P(O)NHP(O)(RO)_2]_y$ where Z is ammonia, an ammonia derivative such as hydrazine, phenylhydrazine or guanidine, and an amine which may be aliphatic (e.g., monomethylamine), aromatic (e.g., aniline), heterocyclic (e.g., aminopyridine), primary (e.g., monoethylamine), secondary (e.g., diethylamine), tertiary (e.g., triethylamine), mono-functional (monomethylamine as afore-listed), or poly-functional (e.g., ethylenediamine) and having from 1 to 16 carbon atoms; where y is equal to the number of basic nitrogen atoms in Z, and where R is selected from the group consisting of the unsubstituted, the nitro-substituted, and the sulfonate-substituted alkyl and aryl radicals having from 1 to 16 carbon atoms.

The compounds of the general formula $Z \cdot [(C_6H_5O)_2P(O)NHP(O)(OC_6H_5)_2]_y$ are new compounds existing as solids generally insoluble in water but soluble in organic solvents such as benzene or ethanol. They are useful for their biological activity such as against bacteria and fungi.

The primary reaction between the imidodiphosphate esters and the nitrogen bases may be conducted in an excess of the amine or in a mutual organic solvent such as dioxane, either under anhydrous conditions or in the presence of water.

The following examples illustrate specific embodiments of the invention:

Example 1

The ammonia derivative of tetraphenyl imidodiphosphate is prepared as follows: A solution of tetraphenyl imidodiphosphate in warm benzene is saturated with ammonia gas. Hexane is added to induce crystallization. The product appears as long fibrous needles and gives a unique X-ray diffraction pattern. The three most intense diffraction lines are given as follows, where the spacings in angstroms are followed in parentheses by their relative intensities: 12.4 A. (100); 4.91 A. (60); 14.1 A. (50).

Analysis.—Calcd. for $NH_3 \cdot [(C_6H_5O)_2P(O)NHP(O)(OC_6H_5)_2]$

N, 5.6; P, 12.4. Found: N, 5.7; P, 12.3.

Example 2

The cyclohexylamine derivative of tetraphenyl imidodiphosphate is prepared as follows: A mixture of 3 grams tetraphenyl imidodiphosphate, 10 ml. dioxane, 2 ml. water and 12 ml. cyclohexylamine is heated at reflux for 2 hours. The solvent is removed under vacuum and the product obtained as a crystalline solid. The product melts at 118° C. and gives a distinctive X-ray diffraction pattern. The three most intense diffraction lines are given as follows, where the spacings in angstroms are followed in parentheses by their relative intensities: 10.8 A. (100); 5.73 A. (10); 4.39 A. (10).

Analysis yields a formula in accordance with the empirical ratio for C:N:P=30:2:2 (theory=30:2:2 for $C_6H_{11}NH_2 \cdot (C_6H_5O)_2P(O)NHP(O)(OC_6H_5)_2$).

Example 3

The ethylenediamine derivatives of tetraphenyl imidodiphosphate is prepared as follows: A mixture of 1 gram tetraphenyl imidodiphosphate, 10 ml. dioxane, and 2 ml. ethylenediamine is warmed until most of the dioxane evaporates, whereupon water is added to precipitate the solid product. On recrystallization from benzene-hexane, needles melting at around 100° C. are obtained which give a unique X-ray diffraction pattern. The three most intense diffraction lines are given as follows, where the spacings in angstroms are followed in parentheses by their relative intensities: 172. A. (100); 13.4 A. (100); 4.65 A. (50).

The analysis conforms to the ratio for C:N:P=50:4:4 (theory=50:4:4 for $C_2H_4(NH_2)_2 \cdot [(C_6H_5O)_2P(O)NHP(O)(OC_6H_5)_2]_2$)

What is claimed is:
1. The nitrogen base derivatives of tetra-substituted imidodiphosphates having the general formula

$Z[(phenyl-O)_2P(O)NHP(O)(O-phenyl)_2]_y$ where Z is a nitrogen base selected from the group consisting of $NH_3$, cyclohexylamine and ethylenediamine; and y is equal to the number of basic nitrogen atoms in Z.

2. The compound $NH_3 \cdot (phenyl\text{-}O)_2P(O)NHP(O)(O\text{-}phenyl)_2$

3. The compound $cyclohexylamine \cdot (phenyl\text{-}O)_2P(O)NHP(O)(O\text{-}phenyl)_2$ 4. The compound $ethylenediamine \cdot [(phenyl\text{-}O)_2P(O)NHP(O\text{-}phenyl)_2]_2$

References Cited by the Examiner

UNITED STATES PATENTS

| | | | |
|---|---|---|---|
| 2,798,086 | 7/1957 | Coover et al. | 260—461 |
| 2,902,401 | 9/1959 | Harwood et al. | 167—22 |
| 3,067,092 | 12/1962 | Feichtinger et al. | 167—22 |

CHARLES B. PARKER, *Primary Examiner.*

LEWIS GOTTS, IRVING MARCUS, *Examiners.*